United States Patent
Yamazaki

(10) Patent No.: US 10,363,937 B2
(45) Date of Patent: Jul. 30, 2019

(54) CONTROL DEVICE FOR VEHICLE

(71) Applicant: HONDA MOTOR CO., LTD., Tokyo (JP)

(72) Inventor: Taku Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 94 days.

(21) Appl. No.: 15/825,104

(22) Filed: Nov. 29, 2017

(65) Prior Publication Data

US 2018/0162401 A1    Jun. 14, 2018

(30) Foreign Application Priority Data

Dec. 14, 2016    (JP) ................. 2016-242604

(51) Int. Cl.
    *F01P 7/10*    (2006.01)
    *B60K 11/02*    (2006.01)
    (Continued)

(52) U.S. Cl.
    CPC ......... *B60W 30/1843* (2013.01); *B60K 11/02* (2013.01); *B60K 11/08* (2013.01); *B60W 30/184* (2013.01); *B60W 30/188* (2013.01); *B60W 30/1884* (2013.01); *F01P 7/10* (2013.01); *F01P 11/14* (2013.01); *F01P 11/16* (2013.01); *F02D 11/105* (2013.01); *F02D 41/0002* (2013.01); *F02D 41/22* (2013.01); *B60W 2510/0676* (2013.01); *B60W 2540/10* (2013.01);
    (Continued)

(58) Field of Classification Search
    CPC ......... B60W 30/1843; B60W 30/1884; B60W 30/184; B60W 30/188; B60W 30/1886; B60W 2540/10; B60W 2710/0622; B60W 2510/0676; B60K 11/08; B60K 11/02; B60K 11/085; F02D 41/22; F02D 41/0002; F02D 41/221; F02D 2041/227; F01P 11/16; F01P 11/14; F01P 7/10
    See application file for complete search history.

(56) References Cited

U.S. PATENT DOCUMENTS

| 2007/0163248 A1* | 7/2007 | Miyashita | F01N 3/101 60/299 |
| 2014/0297081 A1* | 10/2014 | Asami | B60L 3/0061 701/22 |
| 2015/0020758 A1* | 1/2015 | Hosono | B60K 11/085 123/41.04 |

FOREIGN PATENT DOCUMENTS

| JP | 2014-201103 | 10/2014 |
| JP | 2014-218942 | 11/2014 |

\* cited by examiner

*Primary Examiner* — George C Jin
(74) *Attorney, Agent, or Firm* — Mori & Ward, LLP

(57) ABSTRACT

A control device for a vehicle includes a failure detector to detect failure in a cooling device to cool an internal combustion engine of the vehicle. An acceleration operation sensor is to detect an acceleration operation amount indicating a target acceleration. Circuitry is configured to control a power output from the internal combustion engine in accordance with the acceleration operation amount, control an air fuel ratio of air-fuel mixture in the internal combustion engine to be in a richer side with respect to a predetermined air fuel ratio if the acceleration operation amount exceeds a high load threshold, limit the power output from the internal combustion engine if the failure detector detects the failure, and prohibit the air fuel ratio from being controlled to be in the richer side even if the acceleration operation amount exceeds the high load threshold if the failure detector detects the failure.

12 Claims, 5 Drawing Sheets

(51) Int. Cl.
  *F02D 41/22* (2006.01)
  *B60W 30/184* (2012.01)
  *B60W 30/188* (2012.01)
  *B60K 11/08* (2006.01)
  *F01P 11/16* (2006.01)
  *F02D 11/10* (2006.01)
  *F02D 41/00* (2006.01)
  *F01P 11/14* (2006.01)

(52) U.S. Cl.
  CPC .. *B60W 2710/0622* (2013.01); *F01P 2025/32* (2013.01); *F01P 2025/36* (2013.01); *F01P 2025/42* (2013.01); *F01P 2025/62* (2013.01); *F01P 2025/66* (2013.01); *F02D 2041/227* (2013.01); *F02D 2200/602* (2013.01); *Y02T 10/42* (2013.01)

CONTROL DEVICE FOR VEHICLE

CROSS-REFERENCE TO RELATED APPLICATIONS

The present application claims priority under 35 U.S.C. § 119 to Japanese Patent Application No. 2016-242604, filed Dec. 14, 2016. The contents of this application are incorporated herein by reference in their entirety.

BACKGROUND OF THE INVENTION

Field of the Invention

The present invention relates to a control device for a vehicle.

Discussion of the Background

Japanese Patent Application Laid-Open Publication No. 2014-201103 discloses a control device for a vehicle which is provided with a grill shutter in the vicinity of a front grill of the vehicle driven by an internal combustion engine. The grill shutter is located in an air introduction passage for introducing air so as to cool the internal combustion engine, and an opening degree thereof is adjusted in accordance with an engine driving condition and a vehicle traveling condition. When the grill shutter gets out of order, there is a possibility of the occurrence of overheat of the internal combustion engine. Therefore, in the control device as disclosed in Japanese Patent Application Laid-Open Publication No. 2014-201103, limitation of rotational speed and/or output torque of the internal combustion engine is performed when the failure of the grill shutter has been detected.

Similarly, Japanese Patent Application Laid-Open publication No. 2014-218942 discloses a control device which performs failure handling control when the failure of the grill shutter has been detected. In this control device, the failure handling control is performed such that a fuel injection amount in the internal combustion engine is increased when the closing failure of the grill shutter has been detected.

SUMMARY

According to one aspect of the present invention, a control device for a vehicle which is driven by an internal combustion engine and provided with a cooling device for cooling the internal combustion engine, comprises a failure detection means for detecting failure of the cooling device, an acceleration operation amount detection means for detecting an acceleration operation amount indicating acceleration intention of a driver, and an output control means for controlling an output of the internal combustion engine in accordance with the acceleration operation amount, wherein the output control means has an air fuel ratio control means for controlling an air fuel ratio of air-fuel mixture which is burned in the internal combustion engine, and wherein, in a condition in which the failure of the cooling device is detected by the failure detection means, the output control means restrains output of the internal combustion engine and executes failure handling control for prohibiting the air fuel ratio from being controlled to a richer side than a predetermined air fuel ratio when the acceleration operation amount exceeds a high load determination operation amount.

According to another aspect of the present invention, a control device for a vehicle includes a failure detector, an acceleration operation sensor, and circuitry. The failure detector is to detect failure in a cooling device to cool an internal combustion engine of the vehicle. The acceleration operation sensor is to detect an acceleration operation amount indicating a target acceleration input by a driver. The circuitry is configured to control a power output from the internal combustion engine in accordance with the acceleration operation amount. The circuitry is configured to control an air fuel ratio of air-fuel mixture in the internal combustion engine to be in a richer side with respect to a predetermined air fuel ratio if the acceleration operation amount exceeds a high load threshold. The circuitry is configured to limit the power output from the internal combustion engine if the failure detector detects the failure. The circuitry is configured to prohibit the air fuel ratio from being controlled to be in the richer side even if the acceleration operation amount exceeds the high load threshold if the failure detector detects the failure.

According to further aspect of the present invention, a control method for a vehicle includes detecting failure of a cooling device to cool an internal combustion engine in the vehicle. An acceleration operation amount indicating a target acceleration input by a driver is detected. A power output from the internal combustion engine is controlled in accordance with the acceleration operation amount. An air fuel ratio of air-fuel mixture in the internal combustion engine is controlled to be in a richer side with respect to a predetermined air fuel ratio if the acceleration operation amount exceeds a high load threshold. The power output from the internal combustion engine is limited if the failure detector detects the failure. The air fuel ratio is prohibited from being controlled to be in the richer side even if the acceleration operation amount exceeds the high load threshold if the failure detector detects the failure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
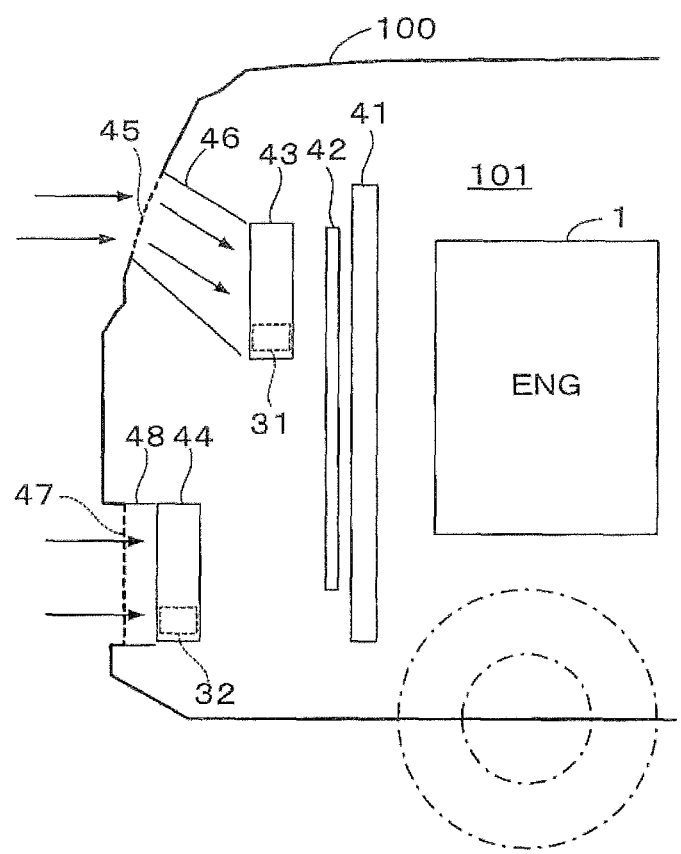
FIG. 1 is a diagram schematically showing a configuration of a front part of a vehicle in accordance with an embodiment of the present invention.

The embodiments will now be described with reference to the accompanying drawings, wherein like reference numerals designate corresponding or identical elements throughout the various drawings.

Hereinafter, an embodiment of the present invention will be explained with reference to drawings.

FIG. 1 is a diagram schematically showing a configuration of a front part of a vehicle in accordance with an embodiment of the present invention. In an engine room 101 provided in the front part of the vehicle 100, there are accommodated an internal combustion engine (hereinafter referred to as "engine") 1 for driving the vehicle 100, a radiator 41 which constitutes a cooling system of the engine 1, a condenser 42 which constitutes a refrigerant circulation system of an air conditioner (not shown) mounted on the vehicle 100, a first and a second grill shutters 43, 44 for adjusting an amount of air which is introduced in order to cool the engine 1.

Into the first grill shutter 43, the air is introduced through a first front grill 45 and a first duct 46 from outside of the vehicle, while, into the second grill shutter 44, the air is introduced through a second front grill 47 and a second duct 48. Each of the first and second grill shutters 43, 44 is provided with a driving unit 31, 32 which includes a direct current motor, and a plurality of fins (not shown) to be driven by the driving unit 31, 32, and has such a publicly known configuration that an opening degree of the shutter is changed by rotating the plurality of fins so as to adjust an introduced air amount.

Figure 2:
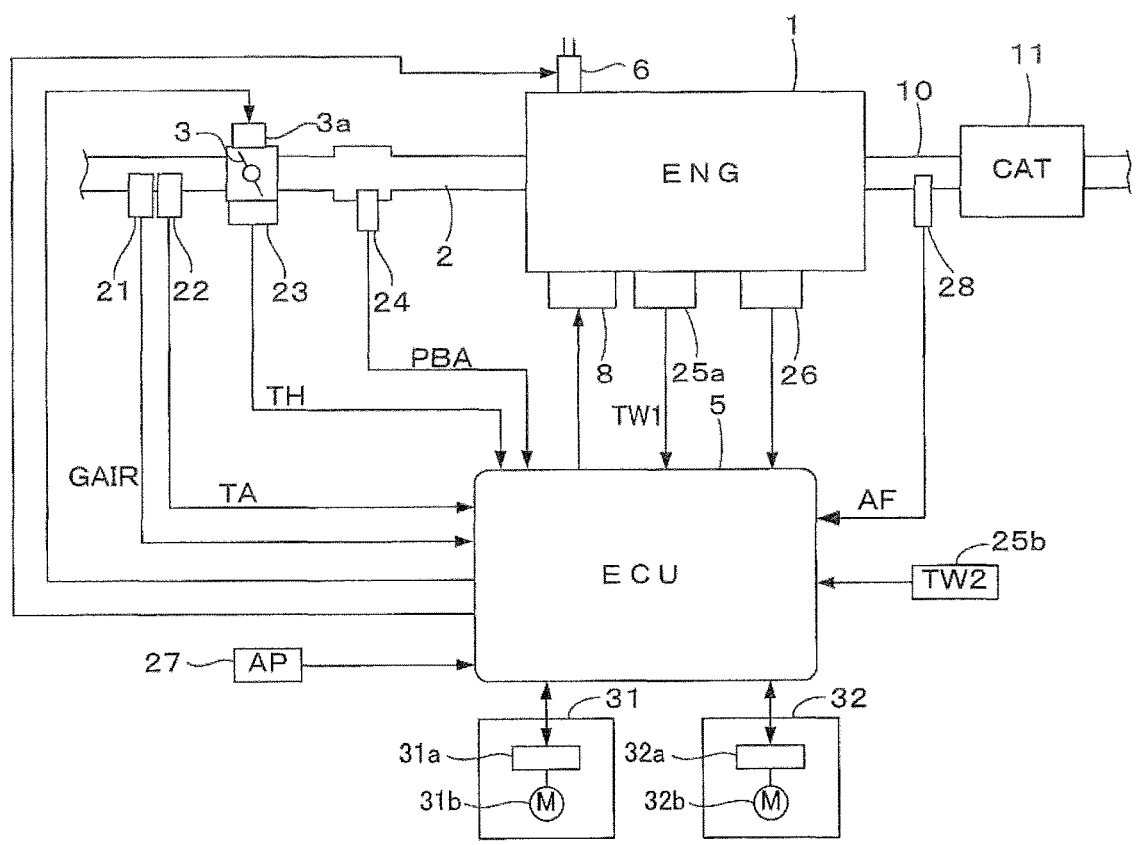
FIG. 2 is a diagram schematically showing configurations of an internal combustion engine and a control device thereof as shown in FIG. 1.

FIG. 2 is a diagram schematically showing configurations of the engine 1 and a control device thereof. A throttle valve 3 is arranged in an intake passage 2 of the engine 1. The engine 1 has four cylinders, for example, and each of the cylinders is provided with an injector 6 for injecting fuel directly into a combustion chamber. The operation of the injector 6 is controlled by an electronic control unit (hereinafter referred to as "ECU") 5. Further, an ignition plug 8 is fitted to each of the cylinders of the engine 1, and the ignition timing by the ignition plug 8 is controlled by the ECU 5.

To the ECU 5 there are connected an intake air amount sensor 21 for detecting an intake air amount GAIR of the engine 1, an intake air temperature sensor 22 for detecting an intake air temperature TA, a throttle valve opening degree sensor 23 for detecting a throttle valve opening degree TH, an intake air pressure sensor 24 for detecting an intake air pressure PBA, a first and a second cooling water temperature sensors 25a and 25b for detecting an engine cooling water temperature, a crank angle position sensor 26 for detecting a rotational angle of a crankshaft (not shown) of the engine 1, an accelerator pedal sensor 27 for detecting an accelerator pedal operation amount AP of the vehicle driven by the engine 1, and other sensors such as a vehicle speed sensor, an atmospheric pressure sensor, and the like which are not illustrated. Detection signals of these sensors are supplied to the ECU 5. The first cooling water temperature sensor 25a is fitted to a cooling water passage of a main body of the engine 1 so as to detect a first cooling water temperature TW1, and the second cooling water temperature sensor 25b is fitted to a cooling water passage (on the upstream side of the radiator 41) in the vicinity of the radiator 41 so as to detect a second cooling water temperature TW2. The crank angle position sensor 26 is configured to output a plurality of pulse signals indicating crank angle positions, and these pulse signals are used for various kinds of timing control such as fuel injection timing, ignition timing, etc., and detection of an engine rotational frequency NE.

An exhaust gas purifying catalyst (for example, a three way catalyst) 11 is provided in an exhaust gas passage 10. An air fuel ratio sensor 28 is mounted on an upstream side of the exhaust gas purifying catalyst 11 and on a downstream side from a collecting part of an exhaust gas manifold which communicates with each of the cylinders such that air fuel ratio AF of an air-fuel mixture which is ignited within the combustion chamber is detected by detecting oxygen concentration within the exhaust gas in the exhaust gas passage 10. The detection signal of the air fuel ratio sensor 28 is supplied to the ECU 5.

The ECU 5 has a conventional configuration which is provided with a CPU, a memory, an input/output circuit and the like, and performs fuel injection control by the injector 6, ignition control by the ignition plug 8, and intake air amount control by an actuator 3a and the throttle valve 3 in accordance with an engine driving condition (mainly the engine rotational frequency NE and the accelerator pedal operation amount AP). Specifically, a target opening degree THCMD of the throttle valve 3 is calculated in accordance with the accelerator pedal operation amount AP, and the intake air amount control for driving the throttle valve 3 by the actuator 3a is performed in such a manner that the throttle valve opening degree TH to be detected corresponds with the target opening degree THCMD.

A fuel injection amount GINJ by the injector 6 is controlled in such a way as to correct a basic fuel amount GINJB which is calculated by using the intake air amount GAIR, by using a target equivalent ratio KCMD and an air fuel ratio correction factor KAF corresponding to the air fuel ratio AF which is detected by the air fuel ratio sensor 23. The air fuel ration correction factor KAF is calculated in such a manner that the air fuel ratio AF (an equivalent ratio KACT) to be detected corresponds with a target air fuel ratio AFCMD (the target equivalent ratio KCMD). The equivalent ratio is a parameter which is proportional to an inverse number of the air fuel ratio AF and which takes "1.0" when the air fuel ratio AF is equal to the theoretical air fuel ratio (14.7). Further, the fuel injection amount GINJ is converted into valve opening time TOUT of the injector 6 in accordance with a fuel pressure PF and fuel density, etc. by using a conventional method and controlled in such a manner that a fuel amount supplied to the combustion chamber per one cycle becomes the fuel injection amount GINJ. The fuel injection amount GINJ is calculated using the following formula (1).

$$GINJ = GINJB \times KCMD \times KAF \times KTOTAL \qquad (1)$$

GINJB is the basic fuel amount which is calculated in such a manner that the air fuel ratio of the air-fuel mixture becomes the theoretical air fuel ratio AFST (=14.7) in accordance with the intake air amount GAIR, and the target equivalent ratio KCMD is represented by the following formula (2) while using the target air fuel ratio AFCMD. KTOTAL is the product of the target equivalent ratio KCMD and a correction factor (for example, a correction factor in accordance with the engine cooling water temperature) other than the air fuel ratio correction factor KAF.

$$KCMD = AFST/AFCMD \qquad (2)$$

In a transient condition such as acceleration time when the accelerator pedal is stepped on, since feedback control by the air fuel ratio correction factor KAF cannot respond thereto sufficiently, the control for allowing the air fuel ratio AF to correspond with the target air fuel ratio AFCMD is performed mainly by feedforward control by the target equivalent ratio KCMD.

The driving units 31, 32 of the first and second grill shutters 43, 44 are connected to the ECU 5. Each of the driving units 31, 32 is provided with a direct current motor 31a, 32a, a link mechanism (not shown) for rotating the plurality of fins by the direct current motor 31a, 32a, and a motor control part 31*b*, 32*b* for performing driving control of the direct current motor 31*a*, 32*a*. The motor control parts 31*b*, 32*b* calculate an operation angle of the fin from the rotation angles of the direct current motors 31*a*, 32*a* and adjust the operation angle of the fin so as to become a target angle. When the fin operation angle cannot be adjusted to be the target angle, the motor control parts 31*b*, 32*b* determine that the failure has occurred. Further, the motor control parts 31*b*, 32*b* detects a current value which is supplied to the direct current motors 31*a*, 32*a*, and determines that the failure has occurred when the detected current value has exceeded a failure determination threshold value.

The motor control parts 31*b*, 32*b* are configured to intercommunicate with the ECU 5, and a command opening degree of the grill shutter, namely, the target angle of the fin operation angle is supplied to the motor control parts from the ECU 5. Further, when having determined that the failure has occurred, the motor control parts 31*b*, 32*b* notify the ECU 5 of it.

Figure 3:
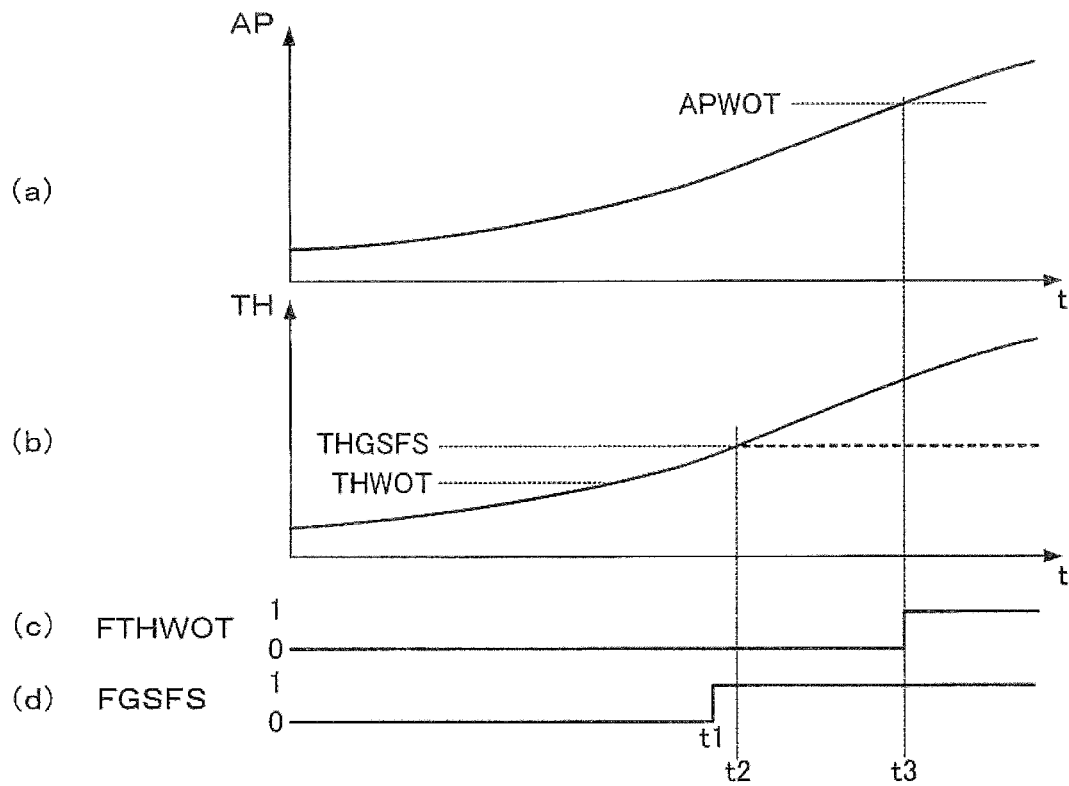
FIG. 3 is a time chart for explaining more specifically a problem according to the embodiment of the present invention to be solved.

FIG. 3 is a time chart for explaining more specifically a problem according to the embodiment of the present invention to be solved, and shows transitions of the accelerator pedal operation amount AP at the time of acceleration of the vehicle 100 ("(a)" in FIG. 3), the throttle valve opening degree TH ("(b)" in FIG. 3), a high load driving condition flag FTHWOT ("(c)" in FIG. 3), and a failure handling control execution flag FGSFS ("(d)" in FIG. 3). The high load driving condition flag FTHWOT is a flag to be set to "1" in a predetermined high load driving condition in which the target air fuel ratio AFCMD is set to be a predetermined rich air fuel ratio AFRICH (for example, about 6~10) on the side richer than the theoretical air fuel ratio AFST, and the failure handling control execution flag FGSFS is set by the processing shown in FIG. 4. In other words, the failure handling control execution flag is a flag which is set to be "1" when the closing failure of at least one of the first and second grill shutters 43, 44 is detected and the second cooling water temperature TW2 is not lower than a predetermined temperature TWTH (for example, about 110 degrees Celsius). The closing failure is such a failure that the shutter opening degree is located on the closing side with respect to the command opening degree, namely, such a failure that the shutter opening degree cannot be brought into a fully opened condition.

In this embodiment, there is employed a method in which the engine 1 is determined to be in the predetermined high load driving condition, when the accelerator pedal operation amount AP is larger than a high load determination operation amount APWOT and the detected throttle valve opening degree TH is larger than a high load determination opening degree THWOT, so that the high load driving condition flag FTHWOT is set to "1".

When the failure handling control execution flag FGSFS is set to "1" at the time t1, the target opening degree THCMD of the throttle valve is restrained so as to be not larger than an upper limit opening degree THGSFS, and the failure handling control for restraining an output of the engine 1 is executed in order to prevent the overheat of the engine 1. Therefore, after the time t2, the throttle valve opening degree TH is fixed at the upper limit opening degree THGSFS. In an example illustrated in this figure, the upper limit opening degree THGSFS is set to an opening degree which is larger than the high load determination opening degree THWOT. When the accelerator pedal operation amount AP exceeds the high load determination operation amount APWOT at the time t3, the high load driving condition flag FTHWOT is set to "1" and the target air fuel ratio AFCMD is set to a predetermined rich air fuel ratio AFRICH.

However, since the throttle valve opening degree TH is fixed at the upper limit opening degree THGSFS, the intake air amount is less than the air amount corresponding to the accelerator pedal operation amount AP in the normal driving condition, and the actual air fuel ratio AF is further enriched more than the predetermined rich air fuel ratio AFRICH, so that there arises such a problem that the exhaust gas characteristic is deteriorated. Since the throttle valve opening degree TH is fixed at the upper limit opening degree THGSFS, the driver further steps down on the accelerator pedal while feeling lack of the accelerator pedal operation amount. Therefore, when the closing failure of the grill shutter occurs, the high load driving condition flag FTHWOT is liable to be set to "1", so that this problem has become conspicuous.

Accordingly, in this embodiment, in the condition in which the failure handling control execution flag FGSFS is set to "1", the high load driving condition flag FTHWOT is prohibited from being set to "1" when the accelerator pedal operation amount AP has exceeded the high load determination operation amount APWOT, so that the deterioration of the exhaust gas characteristic due to the excessive enrichment of the air fuel ratio AF is prevented.

Figure 4:
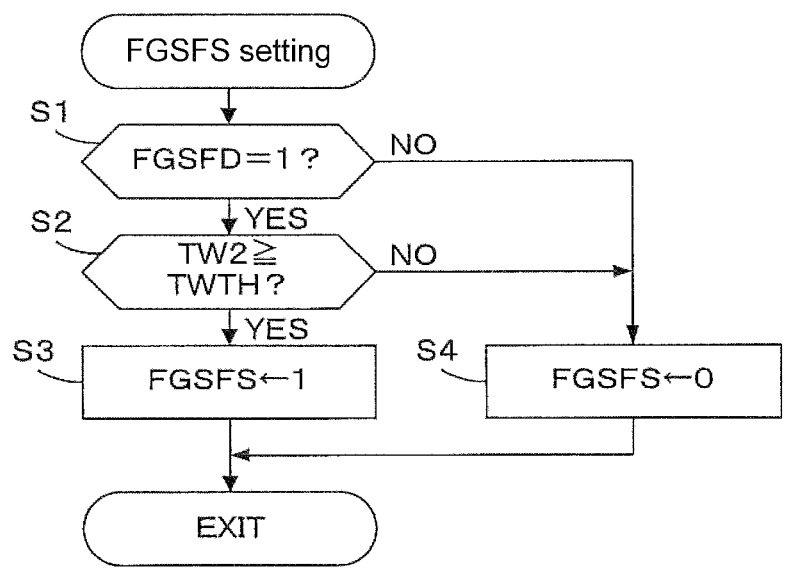
FIG. 4 is a flow chart of processing for setting a failure handling control execution flag.

FIG. 4 is a flow chart of processing for performing the setting of the failure handling control execution flag FGSFS, and this processing is executed at predetermined time intervals in the ECU 5.

In Step S1, it is determined whether or not a failure detection flag FGSFD is "1". The failure detection flag FGSFD is a flag which is set to "1" when the closing failure of at least one of the first and second grill shutters 43, 44 is detected.

When an answer of Step S1 is a positive (YES), it is further determined whether or not the second cooling water temperature TW2 is not lower than the predetermined temperature TWTH (Step S2). When an answer of Step S2 is a positive (YES), the failure handling control execution flag FGSFS is set to "1" (Step S3). The answer of Step S1 or Step S2 is a negative (NO), the failure handling control execution flag FGSFS is set to "0" (Step S3).

Herein, in the condition in which the failure of the second cooling water temperature sensor 25*b* is detected, the first cooling water temperature TW1 is used for determination of Step S2.

Figure 5:
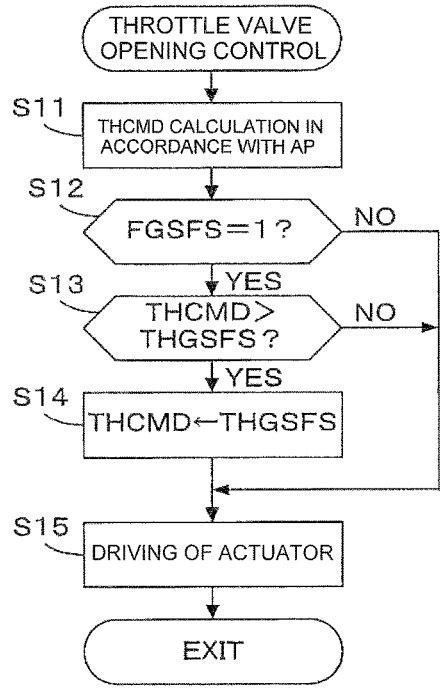
FIG. 5 is a flow chart of throttle valve opening degree control processing.

FIG. 5 is a flow chart of throttle valve opening degree control processing, and this processing is executed at predetermined time intervals in the ECU 5.

In Step S11, the target opening degree THCMD is calculated in accordance with the accelerator pedal operation amount AP. The target opening degree THCMD is calculated in such a way as to increase with increase in the accelerator pedal operation amount AP. In Step S12, it is determined whether or not the failure handling control execution flag FGSFS is "1", and, when its answer is a positive (YES), it is determined whether or not the target opening degree THCMD calculated in Step S11 is larger than the upper limit opening degree THGSFS (Step S13). When an answer of Step S13 is a positive (YES), the target opening degree THCMD is set to the upper limit opening degree THGSFS (Step S14), and processing proceeds to Step S15.

When the answer of Step S12 or Step S13 is a negative (NO), processing proceeds immediately to Step S15. In Step S15, the actuator 3*a* is driven in such a manner that the throttle valve opening degree TH to be detected corresponds with the target opening degree THCMD.

Figure 6:
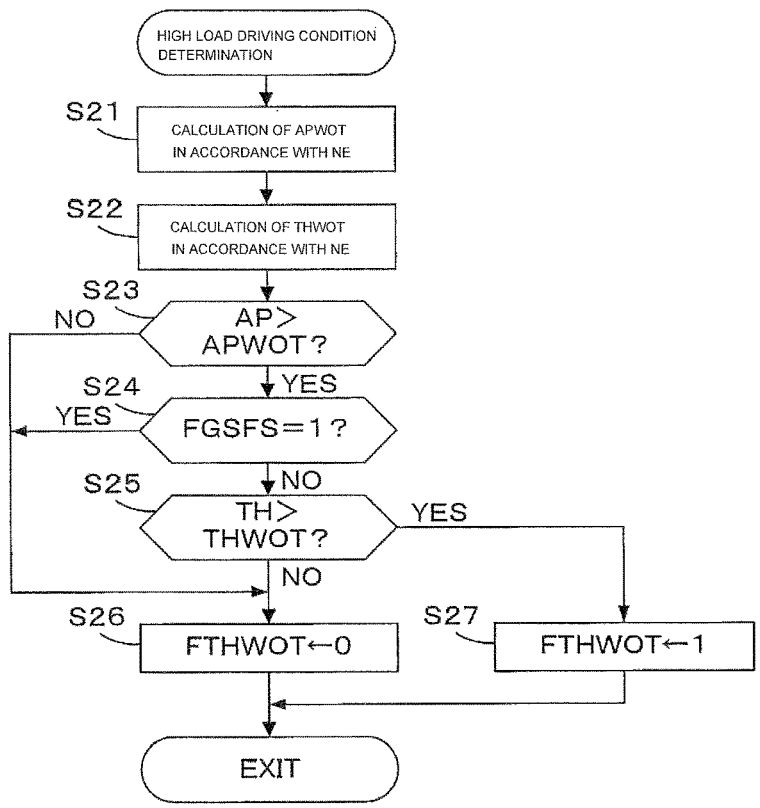
FIG. 6 is a flow chart of processing for determining whether or not the internal combustion engine is in a predetermined high load driving condition.

FIG. 6 is a flow chart of processing for determining whether or not the internal combustion engine (1) is in the above referred predetermined high load driving condition, and this processing is performed in synchronization with the rotational frequency of the engine 1, for example, at the crank angles of every 30 degrees.

Figure 7A:
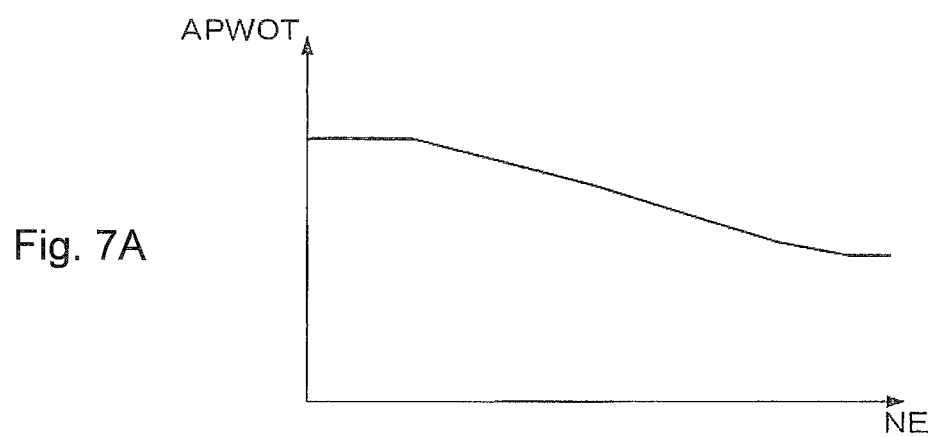
FIGS. 7A and 7B are diagrams showing tables to be referred to in the processing as shown in FIG. 6.

In Step S21, a search of an APWOT table shown in FIG. 7A is performed in accordance with the engine rotational frequency NE, and the high load determination operation amount APWOT is calculated. The APWOT table is set such that the high load determination operation amount APWOT decreases with increase in the engine rotational frequency NE. Letting a maximum value of the accelerator pedal operation amount AP be 100%, the high load determination operation amount APWOT is set so as to be in a range of about 90% to 95%. In other words, the high load driving condition flag FTHWOT is set to "1" when the accelerator operation amount AP is in a condition close to the maximum value.

Figure 7B:
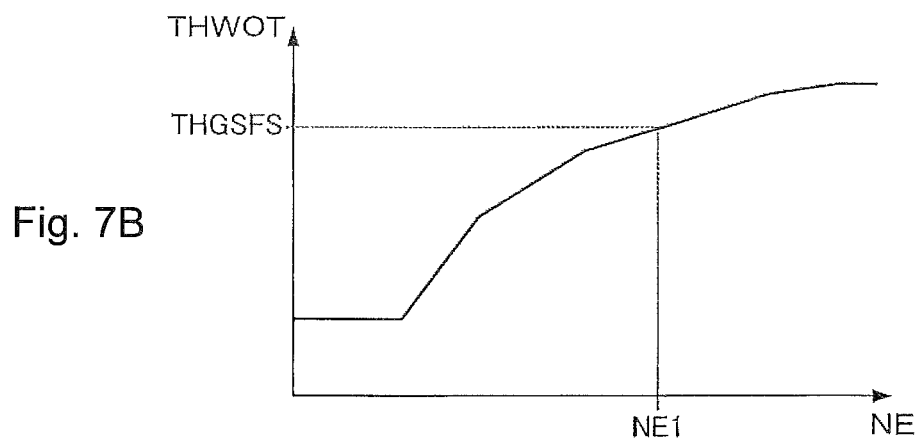

In Step S22, a search of a THWOT table shown in FIG. 7B is performed in accordance with the engine rotational frequency NE, and the high load determination opening degree THWOT is calculated. The THWOT table is set such that the high load determination opening degree THWOT increases with increase in the engine rotational frequency NE. The upper limit opening degree THGSFS in the condition in which the failure handling control execution flag FGSFS is "1", is set to approximately the opening degree as shown in FIG. 7B. In a higher rotational frequency range than the rotational frequency NE1 as shown in the figure, the throttle valve opening degree TH does not exceed the high load determination opening degree THWOT when the failure handling control execution flag FGSFS is "1", so that the above referred problem arises, more specifically, at the time the engine rotational frequency NE is less than the rotational frequency NE1.

In Step S23, it is determined whether or not the accelerator pedal operation amount AP exceeds the high load determination operation amount APWOT, and, when its answer is a negative (NO), the high load driving condition flag FTHWOT is set to "0" (Step S26). When an answer of Step S23 is a positive (YES), it is determined whether or not the failure handling control execution flag FGSFS is "1" (Step S24). When its answer is a positive (YES), processing proceeds immediately to Step S26.

When the answer of Step S24 is a negative (NO) and the failure handling control is not executed, processing proceeds to Step S25, and it is determined whether or not the throttle valve opening degree TH is larger than the high load determination opening degree THWOT. When its answer is a positive (YES), the high load driving condition flag FTHWOT is set to "1" (Step S27). The answer of Step S25 is a negative (NO), processing proceeds to Step S26.

Herein, the determination of Steps S23 and S25 actually involves hysteresis, so that hunting of the control in the case where the accelerator pedal operation amount AP increases and decreases in the vicinity of the high load determination operation amount APWOT and where the throttle valve opening degree TH increases and decreases in the vicinity of the high load determination opening degree THWOT is prevented.

When the high load driving condition flag FTHWOT is "0" and the throttle valve opening degree TH is set to the upper limit opening degree THGSFS, the target air fuel ratio AFCMD is set to the theoretical air fuel ratio AFST.

As explained above, in this embodiment, in the condition in which the closing failure of the grill shutter 43 and/or the grill shutter 44 which adjust the air amount to be introduced into the engine room. 101 in order for cooling the internal combustion engine is detected, the output of the engine 1 is restrained by controlling the throttle valve opening degree TH so as to be not larger than the upper limit opening degree THGSFS (FIG. 5, Steps S12 to S14), and the high load driving condition flag FTHWOT is set to "0", even if the accelerator pedal operation amount AP exceeds the high load determination operation amount APWOT (FIG. 6, Steps S23, S24 and S26). In addition, the failure handling control which prohibits the air fuel ratio AF from being controlled so as to become the rich air fuel ratio AFRICH on the side richer than the theoretical air fuel ratio AFST is executed. Accordingly, it is possible to prevent the deterioration in the exhaust characteristic due to the excessive enrichment of the air fuel ratio AF.

Further, even in the closing condition in which the closing failure of the grill shutters 43 and/or 44 is detected, the failure handling control execution flag FGSFS is maintained at "0" when the second cooling water temperature TW2 which correlates to the temperature of the engine 1 is lower than the predetermined temperature TWTH (FIG. 4, S2, S4), so that the failure handling control is not executed. The predetermined temperature TWTH is set to the cooling water temperature at which there is a high probability that the engine 1 becomes the overheat condition. Therefore, the limitation of the engine output is avoided in such a manner that the failure handling control is not executed until becoming the condition in which there is a high probability that the engine 1 becomes the overheat condition, even if the grill shutters 43 and/or 44 are in failure. Thus, the good driving condition can be maintained.

In this embodiment, the grill shutters 43, 44 correspond to the cooling device, and the accelerator pedal operation amount AP and the accelerator pedal sensor 27 correspond to the acceleration operation amount and the acceleration operation amount detection means (acceleration operation sensor), respectively. Similarly, the motor control parts 31b, 32b which are provided in the grill shutters 43, 44 constitute the failure detection means or a failure detector. The ECU 5 (circuitry) constitutes the output control means including the air fuel ratio control means. The throttle valve 3 and the actuator 3a constitute a part of the output control means. Moreover, the second cooling water sensor 25b corresponds to the engine temperature parameter detection means or an engine temperature sensor.

The present invention is not limited to the above referred embodiment and it is understood that various changes and modifications may be made in the invention. For example, although, in the above referred embodiment, an example in which the vehicle 100 is a vehicle which has the engine 1 as a prime motor is given, the embodiment of the present invention may be applied to the control device of a hybrid vehicle which has the engine and a motor, as the prime motor. Further, a device for inputting acceleration intention of the driver is not limited to the accelerator pedal, and an input device by a manual lever and the like, may be employed. In this case, an operation amount of the manual lever may be applied as the acceleration operation amount. In addition, although, in the above referred embodiment, the second cooling water temperature TW2 (or the first cooling water temperature TW1) is used as the engine temperature parameter, a lubricating oil temperature of the engine 1, and the like, may be used, for example.

Further, although, in the above referred embodiment, the target air fuel ratio AFCMD is configured to be set to the theoretical air fuel ratio AFST when the high load driving condition flag FTHWOT is "0" and the throttle valve opening degree TH is set to the upper limit opening degree THGSFS, it may be set to the air fuel ratio on the lean side close to the theoretical air fuel ratio. Further, when the failure detection flag FGSFD is set to "1" while taking a serious view of more accurate avoidance of the overheat of the engine 1, the failure handling control may be executed irrespective of the cooling water temperature TW2 (or TW1).

Further, although, in the above referred embodiment, an example in which the cooling device is the shutter is given, the cooling device is not limited to it, and the embodiment of the present invention may be applied to the case where the cooling device includes a radiator, a radiator fan, a water pump of circulating the cooling water or a thermostat to be arranged in the cooling water passage.

In order to achieve the above referred object, according to a first aspect of the present invention, a control device for a vehicle (100) which is driven by an internal combustion engine (1) and provided with a cooling device (43, 44) for cooling the internal combustion engine, comprises a failure detection means for detecting failure of the cooling device, an acceleration operation amount detection means for detecting an acceleration operation amount (AP) indicating acceleration intention of a driver, and an output control means for controlling an output of the internal combustion engine in accordance with the acceleration operation amount, wherein the output control means has an air fuel ratio control means for controlling an air fuel ratio (AF) of air-fuel mixture which is burned in the internal combustion engine, and wherein, in a condition in which the failure of the cooling device is detected by the failure detection means, the output control means restrains output of the internal combustion engine and executes failure handling control for prohibiting the air fuel ratio from being controlled to a richer side than a predetermined air fuel ratio (AFST) when the acceleration operation amount (AP) exceeds a high load determination operation amount (APWOT).

With this configuration, in the condition in which the failure of the cooling device for cooling the internal combustion engine is detected, the output of the internal combustion engine is restrained, and the failure handling control for controlling the air fuel ratio to the richer side with respect to the predetermined air fuel ratio when the acceleration operation amount exceeds the high load determination operation amount is executed. Therefore, it is possible to prevent deterioration in an exhaust characteristic due to excessive enrichment of the air fuel ratio.

According to a second aspect of the present invention, the control device for the vehicle as defined in the first aspect further comprises an engine temperature parameter detection means for detecting an engine temperature parameter (TW2) which is correlated with a temperature of the internal combustion engine, wherein the output control means does not execute the failure handling control when the detected engine temperature parameter is lower than a predetermined temperature (TWTH) in the condition in which the failure of the cooling device is detected.

With this configuration, the failure handling control is not executed when the detected engine temperature parameter is lower than the predetermined temperature, even in the condition in which the failure of the cooling device is detected. Herein, the predetermined temperature is set at a temperature at which there is a high possibility that the internal combustion engine becomes an overheat condition. Therefore, the failure handling control is not executed until the cooling device reaches a condition in which there is a high possibility of becoming overheated even if the cooling device is out of order, so that the limitation of the engine output is avoided to the utmost and the good drivability can be maintained.

According to a third aspect of the present invention, in the control device for the vehicle as defined in claim 1 or 2, the cooling device is arranged in an engine room (101) in which the internal combustion engine is accommodated and comprises a grill shutter (43, 44) for adjusting an amount of air which is introduced in order to cool the internal combustion engine.

With this configuration, the deterioration in the exhaust characteristic can be prevented in the condition in which the failure of the grill shutter is detected.

According to a fourth aspect of the present invention, in the control device for the vehicle as defined in the third aspect, the failure detection means detects such closing failure that an opening degree of the grill shutter is located on a closing side with respect to a command opening degree.

With this configuration, the deterioration in the exhaust characteristic can be prevented in the condition in which the failure of the grill shutter is detected.

According to a fifth aspect of the present invention, in the control device for the vehicle as defined in any one of the first to fourth aspects, the predetermined air fuel ratio is a theoretical air fuel ratio (AFST).

With this construction, since a minimum air fuel ratio becomes the theoretical air fuel ratio in the condition in which the acceleration operation amount exceeds the high load determination operation amount, exhaust gas purification by an exhaust gas purifying catalyst provided in an exhaust system of the internal combustion engine can be performed sufficiently so as to maintain the good exhaust characteristic.

Obviously, numerous modifications and variations of the present invention are possible in light of the above teachings. It is therefore to be understood that within the scope of the appended claims, the invention may be practiced otherwise than as specifically described herein.

What is claimed is:

1. A control device for a vehicle which is driven by an internal combustion engine and provided with a cooling device for cooling the internal combustion engine, comprising:
a failure detection means for detecting failure of the cooling device;
an acceleration operation amount detection means for detecting an acceleration operation amount indicating acceleration intention of a driver; and
an output control means for controlling an output of the internal combustion engine in accordance with the acceleration operation amount,
wherein the output control means has an air fuel ratio control means for controlling an air fuel ratio of air-fuel mixture which is burned in the internal combustion engine, and wherein, in a condition in which the failure of the cooling device is detected by the failure detection means, the output control means restrains output of the internal combustion engine and executes failure handling control for prohibiting the air fuel ratio from being controlled to a richer side with respect to a predetermined air fuel ratio when the acceleration operation amount exceeds a high load determination operation amount.

2. A control device for a vehicle according to claim 1, further comprising an engine temperature parameter detection means for detecting an engine temperature parameter which is correlated with a temperature of the internal combustion engine, wherein the output control means does not execute the failure handling control when the detected engine temperature parameter is lower than a predetermined temperature in the condition in which the failure of the cooling device is detected.

3. A control device for a vehicle according to claim 1, wherein the cooling device is arranged in an engine room in which the internal combustion engine is accommodated and comprises a grill shutter for adjusting an amount of air which is introduced in order to cool the internal combustion engine.

4. A control device for a vehicle according to claim 3, wherein the failure detection means detects such closing failure that an opening degree of the grill shutter is located on a closing side with respect to a command opening degree.

5. A control device for a vehicle according to claim 1, wherein the predetermined air fuel ratio is a theoretical air fuel ratio.

6. A control device for a vehicle, comprising:
a failure detector to detect failure in a cooling device to cool an internal combustion engine of the vehicle;
an acceleration operation sensor to detect an acceleration operation amount indicating a target acceleration input by a driver; and
circuitry configured to
control a power output from the internal combustion engine in accordance with the acceleration operation amount,
control an air fuel ratio of air-fuel mixture in the internal combustion engine to be in a richer side with respect to a predetermined air fuel ratio if the acceleration operation amount exceeds a high load threshold,
limit the power output from the internal combustion engine if the failure detector detects the failure, and
prohibit the air fuel ratio from being controlled to be in the richer side even if the acceleration operation amount exceeds the high load threshold if the failure detector detects the failure.

7. The control device according to claim 1, wherein controlling the air fuel ratio to be in the richer side includes controlling the air fuel ratio to be less than the predetermined air fuel ratio.

8. A control device according to claim 6, further comprising an engine temperature sensor to detect an engine temperature parameter corresponding to a temperature of the internal combustion engine, wherein the circuitry does not prohibit from controlling the air fuel ratio when the engine temperature parameter detected is lower than a predetermined temperature if failure detector detects the failure.

9. A control device for a vehicle according to claim 6, wherein the cooling device is arranged in an engine room in which the internal combustion engine is accommodated and comprises a grill shutter to adjust an amount of air to be introduced in order to cool the internal combustion engine.

10. A control device for a vehicle according to claim 9, wherein the failure detector detects a failure of closing in which an opening degree of the grill shutter is smaller than an opening degree in which the grill shutter is controlled to open.

11. A control device for a vehicle according to claim 6, wherein the predetermined air fuel ratio is a theoretical air fuel ratio.

12. A control method for a vehicle, comprising:
detecting failure of a cooling device to cool an internal combustion engine in the vehicle;
detecting an acceleration operation amount indicating a target acceleration input by a driver;
controlling a power output from the internal combustion engine in accordance with the acceleration operation amount;
control an air fuel ratio of air-fuel mixture in the internal combustion engine to be in a richer side with respect to a predetermined air fuel ratio if the acceleration operation amount exceeds a high load threshold;
limiting the power output from the internal combustion engine if the failure detector detects the failure; and
prohibiting the air fuel ratio from being controlled to be in the richer side even if the acceleration operation amount exceeds the high load threshold if the failure detector detects the failure.

* * * * *